Jan. 2, 1951 A. L. JOHNSON 2,536,644
TRANSMISSION
Filed Aug. 29, 1946 4 Sheets-Sheet 1

INVENTOR.
Albert L. Johnson
BY
Robert M. Dunning

Jan. 2, 1951 A. L. JOHNSON 2,536,644
TRANSMISSION
Filed Aug. 29, 1946 4 Sheets-Sheet 2

INVENTOR.
Albert L. Johnson
BY
Robert M. Dunning

Jan. 2, 1951          A. L. JOHNSON          2,536,644

TRANSMISSION

Filed Aug. 29, 1946                              4 Sheets-Sheet 3

INVENTOR.
Albert L. Johnson
BY
Robert M. Dunning

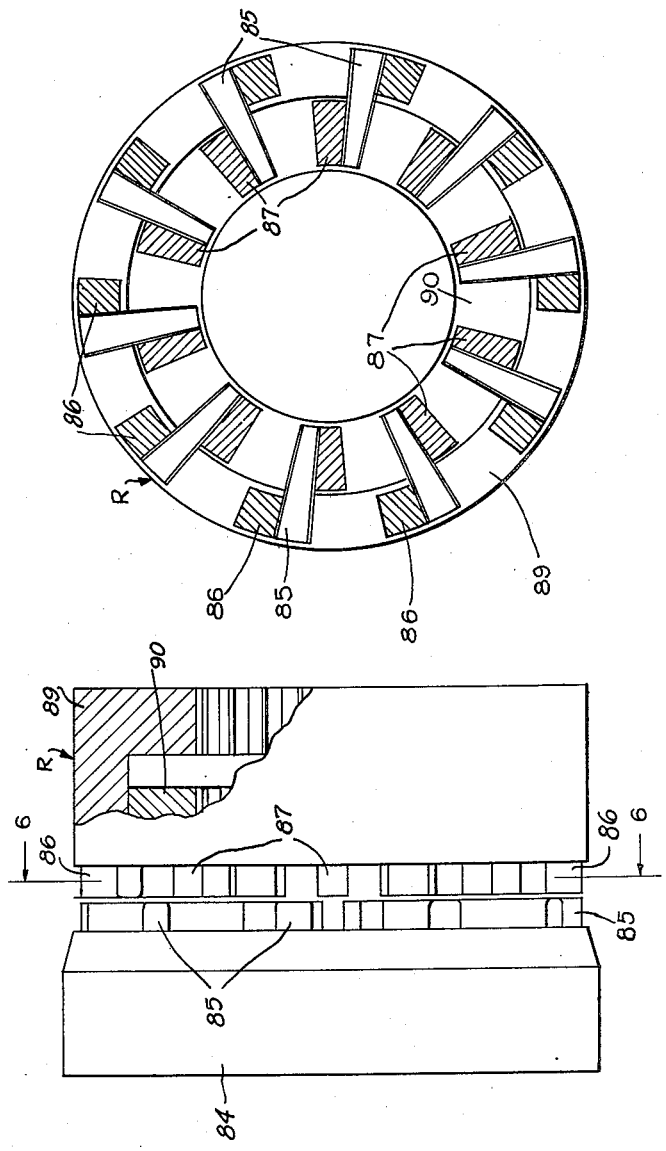

Patented Jan. 2, 1951

2,536,644

UNITED STATES PATENT OFFICE 2,536,644

TRANSMISSION

Albert L. Johnson, St. Paul, Minn., assignor to Johnson Power-On Transmission Corporation of Illinois, Chicago, Ill., a corporation of Illinois Application August 29, 1946, Serial No. 693,646

8 Claims. (Cl. 74—759)

My invention relates to an improvement in transmission wherein it is desired to provide a transmission of the planetary type embodying a number of gears all of which are constantly in mesh.

A feature of the present invention resides in the provision of a single planetary gear system including a sun gear, planet gears, and an encircling ring gear, and to so support these gears that they may be used to produce a reverse rotation of the driven shaft or three different forward speeds of the driven shaft.

A feature of the present invention lies in the provision of a single planetary gear system and in means for locking various elements of the system for rotation in unison, thereby providing various combinations of speeds.

A feature of the present invention resides in the provision of a single planetary gear system including a sun gear, planet gears, and a ring gear cooperable therewith, and in the provision of a means for selectively holding any of the elements of the planetary system from rotation about the axis of the sun gear. In preferred form each of the rotatable elements is provided with a brake drum which may be engaged by a hydraulically expandable friction element.

A further feature of the present invention lies in the provision of a planetary gear system with means for locking various of the rotatable parts from relative rotation and also for locking certain of the rotatable parts from rotation about the axis of the sun gear. Through this means a plurality of speeds may be obtained by a single planetary gear system.

These and other objects and novel features of my invention will be more clearly and fully set forth in the following specification and claims.

In the drawings forming a part of my specification:

Figure 1 is a side elevational view partly in section showing the transmission connected to the drive shaft of an internal combustion engine or the like.

Figure 5 is a detail side view of one of the clutch units for interlocking rotary parts for movement in unison.

Figure 6 is a sectional view on the line 6—6 of Figure 5.

Figure 1:
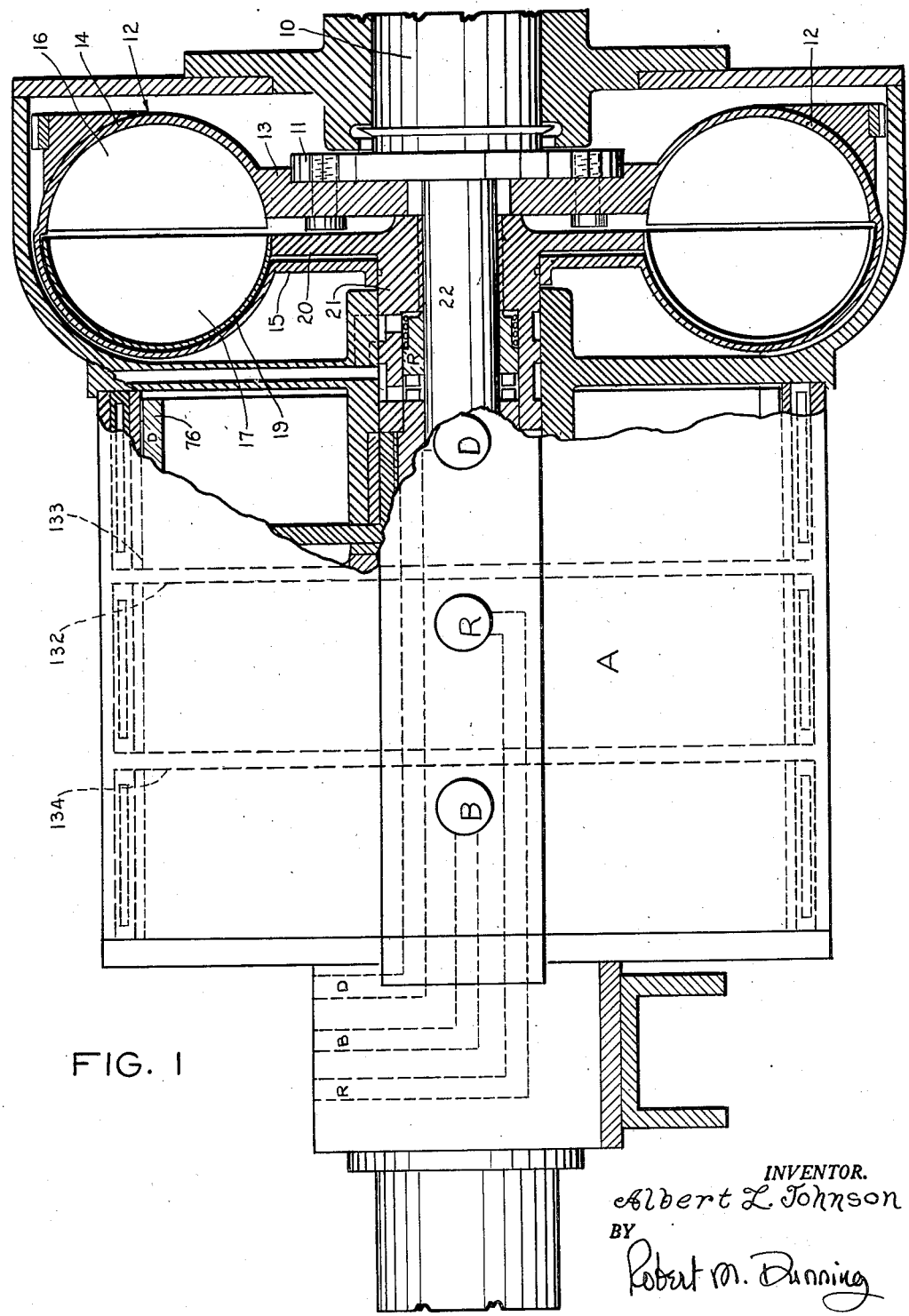
Figure 2:
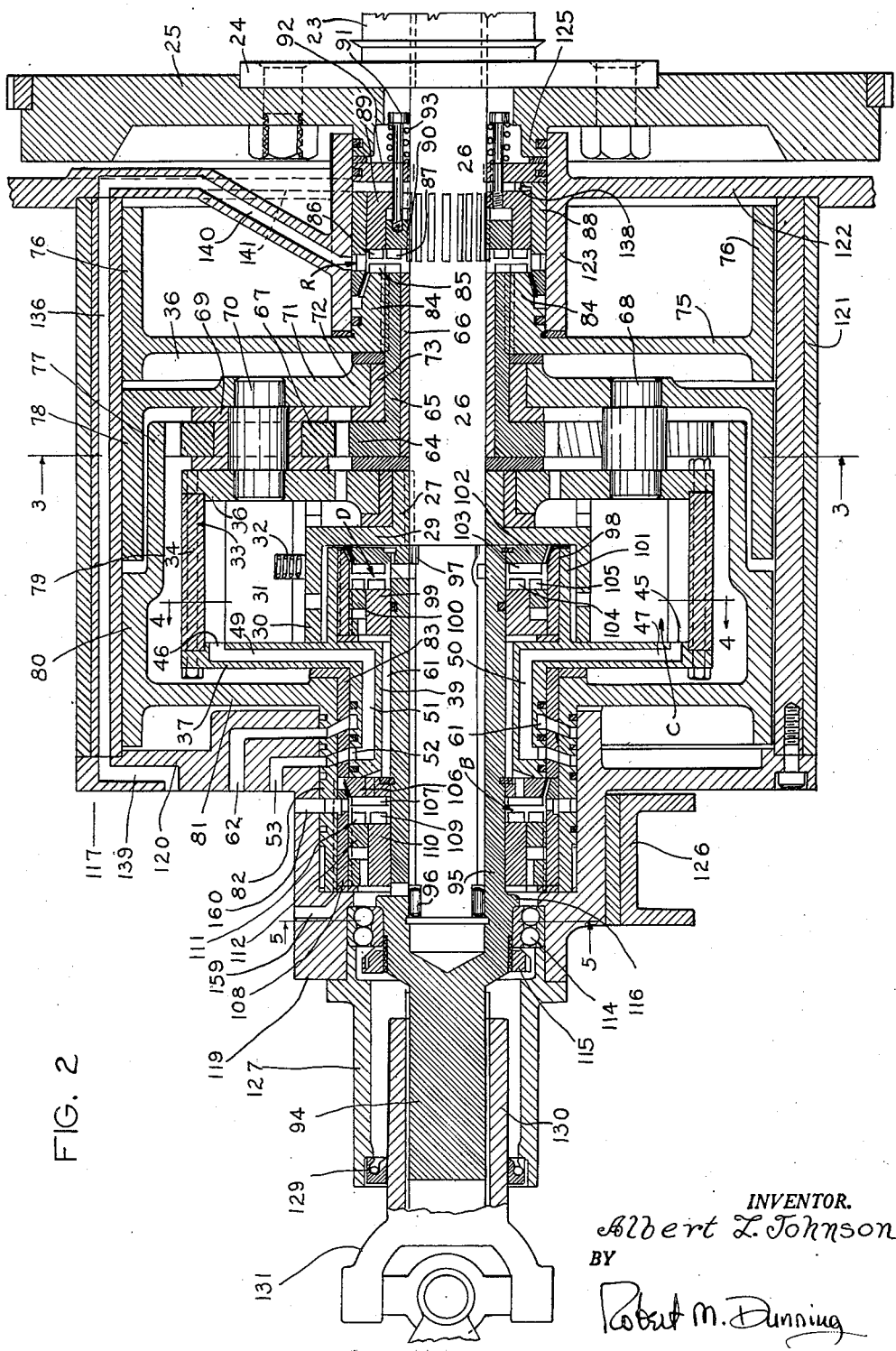
Figure 2 is a vertical section through the transmission illustrated in Figure 1.

The transmission A, as illustrated in Figure 1 of the drawings, is connected through a hydraulic coupling to the drive shaft of the engine. Figure 2 is similar to Figure 1, but shows the drive shaft directly connected to the fly wheel of the engine. In other respects the transmission shown in Figures 1 and 2 of the drawings are identical.

In the construction shown in Figure 1, the engine crank shaft 10 is connected to a flange 11, which in turn is connected to the hydraulic coupling member 12. In the construction illustrated the hydraulic coupling member 12 includes a ring shaped attaching flange 13 and an enlarged ring shaped casing 14. This casing 14 is connected to a ring shaped flange 15 positioned in parallel spaced relation to the ange 13. These flanges 13 and 15, together with the circular ring shaped enclosure 14, form a chamber for the fluid coupling. Vanes 16 are secured to one wall of the ring shaped chamber 14 as is common in such fluid couplings. Opposed vanes 17 are supported by a relatively rotatable ring shaped support 19 enclosed within the enclosure 12. The support 19 is in turn supported by a flange 20 having a hub 21 keyed to the transmission drive shaft 22.

As will be understood without further explanation, rotation of the engine crank shaft 10 acts to rotate the casing 12, thereby rotating the vanes 16. Rotation of the vanes 16 acts through the fluid contained within the chamber to rotate the support 19 carrying the vanes 17. This movement acts through the flange 20 and hub 21 to drive the transmission drive shaft 22.

The drive mechanism illustrated in Figure 2 of the drawings is somewhat more simple. The engine crank shaft 23 is provided with a flange 24 which is bolted or otherwise affixed to the fly wheel 25. A projection 26 of the drive shaft 23 acts as the transmission drive shaft.

Figure 4:
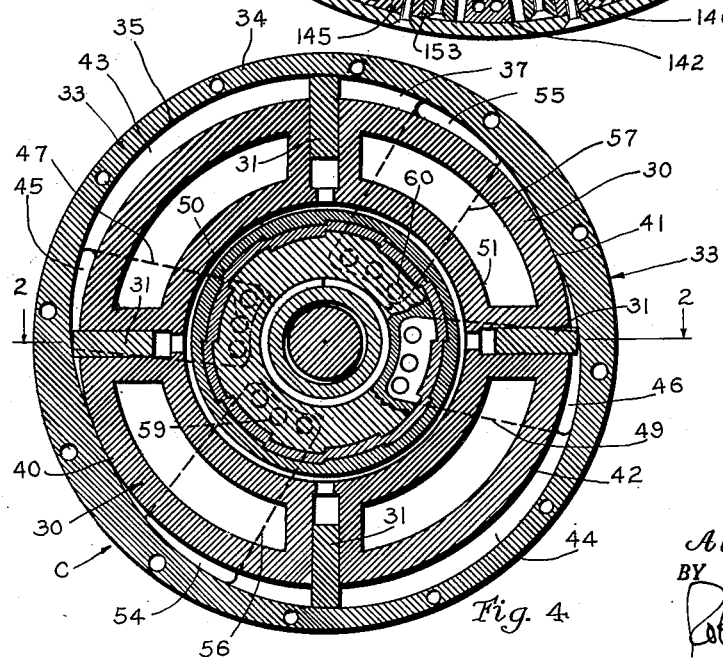
Figure 4 is a sectional view through a portion of the transmission, the position of the section being indicated by the line 4—4 of Figure 2.

A hub 27 is keyed to the shaft 26 to rotate therewith. The hub 27 supports a ring shaped flange 29 which in turn supports a rotary member 30 of a clutch unit C best illustrated in Figure 4 of the drawings. The rotary member 30 of the clutch unit C provides a support for radially slidable vanes 31 which may, if desired, be normally urged outwardly by a light coil spring 32, as well as by centrifugal force. The vanes 31 are rotatable within, and reciprocated radially by, an eccentric outer casing 33 which is rotatable relative to the inner rotor 30 and which enclose the vanes 31.

The outer casing 33 of the clutch unit C includes an outer cylindrical shell 34 having an eccentric inner surface 35. One end of the sleeve 34 is closed by a ring shaped disc 36 which forms a part of the planet gear carrier. The other end of the sleeve 34 is closed by a disc 37 which is provided with an integral hub 39. Fluid passages are provided in the disc 37 and the hub 39, these passages being angularly spaced and communicable with two peripheral grooves on the hub 39. The passages may best be seen in Figure 4 of the drawings.

As illustrated in this figure, the eccentric inner surface 35 of the enclosing sleeve 34 is provided with a pair of opposed contacting areas 40 and 41 which extend into close proximity with the outer surface 42 of the rotatable clutch member 30. Between these contacting areas 40 and 41 the inner sleeve surface 35 curves away from the cylindrical surface 42 of the rotatable member 30 to form a pair of opposed fluid pockets 43 and 44. The corresponding ends of these pockets are provided with apertures 45 and 46, respectively, which are formed in the disk like end member 37. These apertures 45 and 46 are connected by communicating passages 47 and 49, respectively, to transverse passages 50 and 51 in the hub 39. These transverse passages 50 and 51 communicate with a peripheral groove 52 in the hub 39. In other words, both of the apertures 45 and 46 are connected by suitable fluid passages to a collector groove 52 in the exterior surface of the hub 39 so that fluid may flow thereinto from a suitable fluid control passage 53. The connection between the control conduit 53 and the groove 52 extends through a series of rotatable hubs, which, however, are grooved and drilled suitably to permit oil to flow from the control passage 53 into the pockets 43 and 44 through the apertures 45 and 46.

A similar pair of apertures 54 and 55 are provided in the disc 37 which communicate with radially extending passages 56 and 57, respectively. These passages 56 and 57 communicate with axially extending passages 59 and 60, respectively, extending through the hub 39 into communication with the peripheral groove 61 thereupon. The passages 59 and 60 are similar to the passages 50 and 51, but are angularly spaced therefrom in the hub 39. The groove 61 communicates through relatively rotatable members encircling the hub 39 with a fluid control passage 62.

The clutch unit C is designed to serve as a means of coupling the rotatable member 30 and the casing 33 for rotation in unison.

If the passages 53 and 62 are open, fluid may be forced out of the pockets 43 and 44 through the apertures at corresponding ends of these pockets, and back into the pockets through the apertures at the other ends thereof. In other words, fluid may be forced by the vanes 31 through the apertures 45 and 46, through the radial passages 47 and 49, through the hub passages 50 and 51, and the control passage 53. This fluid may flow back through passage 62, hub passages 59 and 60, radial passages 56 and 57, and apertures 54 and 55, and into the pockets 43 and 44. In such an event, the rotor 30 could revolve relative to the casing 30. However, if the connection between the control passages 53 and 62 is closed, fluid cannot escape from the pockets 43 and 44, and the rotor 30 is locked from rotation relative to the casing 33. The same general action is obtained regardless of the direction of relative rotation of the rotor 30 and casing 33.

Figure 3:
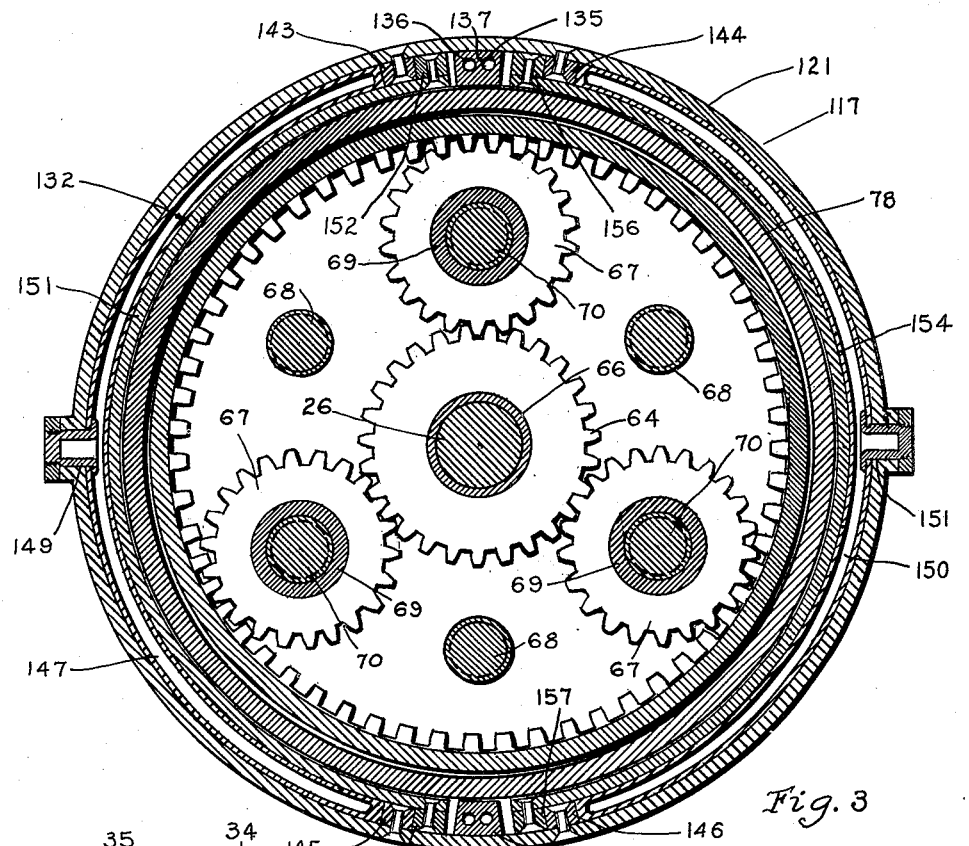
Figure 3 is a transverse section through the transmission the position of the section being indicated by the line 3—3 of Figure 2.

A sun gear 64 is provided with a hub 65 mounted upon a bearing 66 on the drive shaft 26. This sun gear 64 is engageable with angularly spaced planet gears 67 supported on bearings 69 mounted upon axes or stub shafts 70. The stub shafts 70 are journaled in the end plate 36 and also in the disc-like flange 71 in parallel spaced relation to the end closing flange 36. The flange 71 is provided with a hub 72 supported on a bearing 73 encircling the hub 65 of the sun gear 64. The flange 71 is provided at its outer extremity with a cylindrical brake drum 78 which may be used to hold the axes of the planet gears as well as the outer casing 33 of the brake unit C from rotation. Pins 68 or other suitable means positioned between the planet gears 67 connect the flange 71 with the casing end plate 36 to hold these two elements from relative rotation. These pins 68 are best illustrated in Figures 2 and 3 of the drawings.

The hub 65 of the sun gear 64 is splined or keyed to the hub 84 of a disc-like flange 75 supporting the brake drum 76. This brake drum 76 is preferable coaxial with and adjacent the brake drum 78, and means are provided for holding the brake drum 76 from rotation, thereby holding the sun gear 64 stationary.

The internal ring gear 77 is supported by a cylindrical flange 79 integral with the brake drum 80. The brake drum 80 is concentric with and adjacent the brake drum 78 and means may be applied to this brake drum for holding the ring gear from rotation. The ring gear 77 and the brake drums 80 are supported by a disc-shaped flange or support 81 having a hub 82 rotatable upon a sleeve bearing 83 encircling the hub 39 of the casing 33.

The hub 84 is splined or key connected to the hub 65 of the sun gear 64 and is provided with teeth 85 engageable with cooperable teeth 86 and 87 on a pair of slidable collars 89 and 90. The concentric collars 88, 89, and 90 are movable in cooperation and both collars 89 and 90 are spline connected to the transmission drive shaft 26. A series of push rods 91 on the collar 90 extend slidably through a fixed collar 92 keyed to the shaft 26 and a spring 93 acts to hold the collar 90 retracted. However, when pressure is applied to move the collars 88, 89, and 90 to the left as indicated in Figure 2 of the drawings, either one set of teeth 86 or the other set 87 will engage the projecting teeth 85 on the collar 84 to cause rotation of the sun gear 64 with the drive shaft 26. The collar 88 and the collar 84 have cooperable frustro-conical friction surfaces thereon which hold these elements from rapid relative rotation.

The construction of the clutch R is best illustrated in Figures 5 and 6 of the drawings. The collars 89 and 90 are so arranged that the teeth 86 of the collar 89 are in staggered relationship with the teeth 87 of the collar 90. Thus as the collars 89 and 90 move toward the teeth 85 these teeth 85 will quickly engage between certain of the teeth 86 and 87 to provide a positive drive therebetween. In the event the teeth 86 strike the surface of the cooperable teeth 85, further inward movement of the unit will urge the teeth 87 between the spaced teeth 85 so that upon slight angular relative movement between the hub 84 and the collars 89 and 90 due to slippage between the friction surfaces on collars 84 and 88 (see Figure 2), the teeth 85 will engage between the teeth 86 and 87. Similarly in the event the teeth 87 strike the surface of the teeth 85, the teeth 86 will continue their inward movement and will extend between the teeth 85 to engage the same upon slight angular relative movement between the collars 89 and 90. The friction surfaces on collars 84 and 88 permit slight relative rotation between these collars, but prevent a clashing of teeth when teeth 86 and 87 engage teeth 85. This synchronizing means is desirable to provide a smooth clutch connection between the sun gear and the collars 89 and 90 keyed to the transmission drive shaft 26.

The driven shaft 94 is provided with a hollow socket 95 at one end designed to encircle the projecting end of the transmission drive shaft 26. Roller bearings 96 and 97 may be interposed between the socket 95 and the shaft 26 to insure proper relative rotation therebetween. A collar 98 encircles the socketed end 95 of the shaft 94 and is slidable relative thereto. This collar 98 carries an auxiliary slidable collar 100 and a friction collar 98 keyed thereto. The collars 98, 99, and 100 are spline connected to a cylindrical flange 101 on the disc-like end 37 of the casing 33. Thus the collars 99 and 100 are always rotatable in unison with the rotor casing 33.

A collar 102 is keyed to the socketed end 95 of the driven shaft 94. This collar 102 bears teeth 103, similar to teeth 85 of clutch R, cooperable with the teeth 104 and 105 on the collars 99 and 100 respectively. The teeth 104 and 105 correspond to the teeth 87 and 86 of clutch R. The collar 98 and the collar 102 have cooperable friction surfaces thereon. The collars 98, 99, and 100 separate to form a synchronizing clutch D similar to the clutch R previously described to connect the sun gear 64 to the drive shaft 26. In the extreme position of the collars 99 and 100 illustrated, the teeth and the friction collar 98 are disengaged. However, when the collars 99 and 100 are moved to the right as viewed in Figure 2, the casing 33 will be positively connected to the driven shaft 94 so as to rotate therewith in unison.

A clutch B similar to the clutches R and D is provided for connecting the hub 82 of the brake drum 80 and ring gear 77 to the driven shaft 94. A collar 106 is keyed to the driven shaft 94 and is provided with teeth 107, similar to teeth 85 of clutch R, projecting therefrom. These teeth are engageable with teeth 109 on a collar 110 and are also engageable with teeth 111 carried by a cooperable collar 112. The teeth 109 and 111 correspond to teeth 87 and 86 of clutch R. A collar 108 is provided with friction surfaces cooperable with friction surfaces on the collar 106. The collars 108, 110, and 112 are keyed to the hub 82. The provision of separate collars 110 and 112 cooperable with the teeth 107, and the provision of the friction surfaces, is to provide a synchronized clutch system of the type R previously described. When the collars 110 and 112 are in the position illustrated in Figure 2 of the drawings the hub 82 may rotate relative to the driven shaft 94. However, when the collars 108, 110, and 112 are moved to the right so that the friction surface on collar 108 engages the cooperable surface on collar 106, and the teeth 109 and 111 engage the teeth 107 of the collar 106 on the driven shaft, the hub 82 is positively connected to this driven shaft.

A bearing 114 encircles the socketed portion 95 of the driven shaft 94 and is held in place by a lock nut 115. This bearing 114 engages a shoulder 116 on the shaft 94 and acts to hold the driven shaft from axial movement. The transmission housing encloses the mechanism previously described. This housing which is indicated in general by the numeral 117 includes a hub 119 encircling the bearing 114 and a disc-like end plate 120 which is connected to the hub. The end plate 120 closes one end of the outer cylindrical casing sleeve 121. The other end of the casing is closed by a casing end closure 122 which supports a sleeve or hub 123. The hub or sleeve 123 serves to support the collar 88 within which the collar 89 is supported. The collar 84 also serves as a bearing within the sleeve 123. The keyed flange or collar 92 likewise seals against the inner surface of the sleeve 123. A flange 125 on the fly wheel 25 extends into the outer end of the sleeve 123 and is sealed with respect thereto.

A transmission housing support 126 may be provided on any suitable point of the outer housing 117 so as to support the casing. An effective oil seal is also preferably provided at the outer extremity of the driven shaft 94. A sleeve 127 fits within the hub 119 at the end thereof and is secured to the hub in this position. This sleeve extends outwardly from the transmission casing to support an oil seal 129. The oil seal 129 encircles the socketed end 130 of the universal joint connection 131 which is spline connected to the projecting end of the driven shaft 94.

In the foregoing description I have described brake drums 76, 78, and 80 which may permit certain parts of the transmission to be held from rotation. In order to hold the various brake drums from rotation, I provide expandable brake elements engageable with the respective brake drums. Brake elements 132 are engageable with the brake drum 78 to hold the same from rotation. Brake elements 133 are engageable with the brake drum 76 to hold the same from rotation. Brake elements 134 are engageable with the brake drum 80 to hold the same from rotation. As all of the brake elements 132, 133, 134 are identical in construction only one of these means has been illustrated in detail.

This means is best illustrated in Figure 3 of the drawings. Integral with the outer shell 121 of the housing 117 along the top of the housing I provide an internally extending rib 135 which is provided for containing a pair of pressure conduits 136 and 137. With reference to Figure 2 of the drawings the passage 136 leads from the pressure inlet opening 139 to the passage 140 leading to the left hand end of the collars 88, 89, and 90. The other passage 137 is connected by a passage 141 to the right hand end of the collars 89 and 90. This passage 137 also communicates with a suitable pressure inlet not illustrated. Accordingly the collars 89 and 90 may be moved either to the right or to the left along the shaft 26 by hydraulic pressure so as to either engage or disengage the clutch teeth 85 with the cooperable teeth 86 and 87. The collar 88 is moved to the left by hydraulic pressure, and fingers 138 on collar 88 engage collar 89 to insure disengagement of the friction surfaces. A rib 142, similar to the rib 135, projects inwardly from the bottom of the casing to contain hydraulic passages leading to others of the hydraulically controlled clutches. In view of the fact that the particular location of the various hydraulic passages is not important to the invention, these passages will not be described in detail.

Spaced from the rib 135 and parallel to the same, I provide a pair of inwardly projecting ribs 143 and 144. In a similar manner in spaced relation to the lower rib 142 I provide a pair of longitudinally extending ribs 145 and 146. The purpose of these ribs will be later more clearly understood.

A substantially semi-cylindrical hollow expandable member 147 follows the curvature of the inside surface of the cylindrical shell 121 between the ribs 143 and 145. A nipple 149 extends through the casing wall and provides a communication with the hollow interior of the expandable member 147. This expandable member is entirely closed about its marginal edges and the nipple 149 forms the only communication with the interior thereof.

A similar hollow expandable member 150 is provided between the projections or ribs 144 and 146 and is provided with a nipple 151 which acts to hold the expandable member 150 in proper position. The nipple 151 forms the only communication with the interior of the hollow semi-cylindrical expandable member 150.

A brake shoe 151 equivalent with a suitable friction surface on its inner side is positioned inwardly of the expandable member 147. The brake shoe 151 is provided at its ends with a shoulder 152 which engages between the rib 143 and the central rib 135. The brake shoe 151 is similarly provided with a shoulder or projection 153 extending outwardly from the other end of the brake shoe to engage between the rib 145 and the central rib 142.

A brake shoe 154 similar to the brake shoe 151 is positioned inwardly of the expandable member 150. This brake shoe is provided with a suitable friction surface on its inner side and is provided with a projecting shoulder 156 at one end thereof designed to engage between the rib 144 and the rib 135. The brake shoe 154 is similarly provided with a projection or shoulder 157 at its other extremity designed to engage between the rib 146 and the rib 142. Thus the brake shoes are anchored from rotary movement by the shoulders on each end of the brake shoe for their interengagement with the fixed ribs on the inner casing surface.

In the event the brake drum 78 is rotated in a clockwise direction and pressure is applied in the expandable elements 147 and 150 to urge the brake shoes 151 and 154 against the brake drum 78, the shoulder 156 will engage against the rib 144 permitting the other end of this brake shoe 154 to wrap about the drum 78.

Similarly the projection 153 will engage against the rib 154, allowing the other end of the brake shoe to wrap about the drum 78. Sufficient play is provided to permit this action.

In a similar manner if the brake drum 78 is rotated in a counter-clockwise direction the projections 152 and 157 of the brake shoes 151 and 154, respectively will engage against the ribs 143 and 146 respectively, allowing the other end of brake shoes to wrap about the drum 78. This action allows the brake shoes to be free at one end and regardless of the direction of rotation of the brake drum.

The operation of my transmission is relatively simple. In order to operate the transmission various parts thereof are moved by hydraulic pressure. Certain of the passages for transmitting this hydraulic pressure have been described. The particular location and arrangement of these passages is not of extreme importance in the present invention and thus all of these connections have not been described in detail. Furthermore a suitable controller is provided for directing fluid passage to the proper locations and each operation of the transmission. This controller has not been illustrated in the drawings for the purpose of simplicity, it being understood that fluid under pressure is directed to the various points of the transmission when necessary to accomplish the desired result.

Rotation of the drive shaft 26 will act to rotate the rotor 30 of the clutch unit C. Rotation of the rotor 30 acts to pump oil or other fluid within the outer rotor casing 30, but as long as the passages leading to the apertures 45, 46, 54, and 55 are open the fluid may be pumped without rotating the portion 33 of the casing. The rotation of the drive shaft thus will not act to rotate the driven shaft. In order to drive the shaft 94 in a reverse direction the clutch B is first engaged. This is accomplished by applying hydraulic pressure through the passage 159 on the left side of the clutch collars 108, 110, and 112 of the clutch B and subjecting the passage 160 leading to the chamber on the right side of these collars to atmospheric pressure. Hydraulic pressure on the left side of the clutch collars or clutch B forces the collars 108, 110, and 112 to the right, interengaging the friction surfaces of collars 106 and 108, tending to rotate these collars in unison but with sufficient slippage to permit subsequent engagement of the teeth 107 with the cooperable teeth 109 and 111. As a result the hub 82 is positively connected to the driven shaft 94. The brake drum 80 and ring gear 77 are thus also positively connected to the driven shaft.

The clutch R is then engaged. This is accomplished by directing hydraulic pressure through the passage 141 to the chamber to the right of this clutch, moving the collars 88, 89, and 90 to the left, engaging the cooperable friction surfaces on collars 84 and 88, engaging the teeth 86 and 87 thereon with the cooperable teeth 85. As the collars 88, 89 and 90 rotate with the drive shaft 26, engagement of the clutch R acts to rotate the sun gear 64 in unison with the drive shaft. At this stage of the operation the ring gear 77 is stationary with the driven shaft 94 and the sun gear 64 is rotated at the speed of the drive shaft. This causes the planet gear carrier including the casing 33 to rotate at a speed equal to half the rotating speed of the sun gear C. Pressure is now applied to the brake elements 132 in the manner previously described to halt rotation of the brake drum 78. When the drum 78 is held from rotation the planet gear carried including the rotor casing 33 will be likewise held stationary, the sun gear acting through the planet gears 67 to rotate the ring gear 77 in a reverse direction. As the ring gear 77 is connected through the hub 82 and the clutch B to the driven shaft 94, this driven shaft will be rotated in a reverse direction.

To operate the driven shaft 94 at a low speed in a forward direction, the clutches B and R previously described are released into the position shown in Figure 2. Fluid is directed through suitable inlet pressure passages such as 161 to the left hand side of the collars 98, 99, and 100 of clutch D, urging these clutch collars to the right from the position illustrated in Figure 2. This causes engagement between the friction surfaces on collars 98 and 102, and then causes engagement between the teeth 104 and 105 and the cooperable teeth 103 on the collar 102 keyed to the driven shaft 94. As a result the casing 33 of the clutch unit C is operatively connected to the driven shaft. As the casing 33 forms a part of the planet gear carrier the planet gear carrier is thus connected to the driven shaft.

Fluid is next introduced through the passage 141 to the right hand side of the clutch R, urging the collars 88, 89, and 90 from the left and causing engagement between friction surfaces on collars 84 and 88, and between the teeth 86 and 87 and the cooperable teeth 85. As a result the sun gear 64 is operatively connected to the drive shaft 26, rotating the sun gear 64 with the drive shaft. As the planetary gear carriage is held stationary with the driven shaft, rotation of the sun gear 64 acts to rotate the ring gear 77 in a reverse direction.

Hydraulic pressure is then applied to the brake elements 134 to hold the brake drum 80 from rotation. This halts the rotary movement of the ring gear 77, causing the sun gear 64 to rotate the planet gear carrier in a forward direction. As the planet gear is connected by the clutch D to the driven shaft 94, this driven shaft will likewise be driven in a forward direction of rotation.

To rotate the driven shaft 94 in a forward direction at a speed equal to that of the drive shaft or to place the transmission in what may be considered high gear, the clutches D and R remain engaged, but the brake drum 80 is released. Next the clutch unit C is engaged. This is accomplished by closing the outlet passages from the casing 34 so as to prevent liquid from flowing from this casing. This action locks the casing 33 to rotate with the rotary portion 30 of the clutch unit C positively by the drive shaft 26. As the clutch D is engaged, connecting the casing 33 of the brake unit C to the driven shaft, the driven shaft will be rotated at a speed equal to that of the drive shaft.

To prepare the transmission to shift into overdrive, the clutch R is next disengaged by applying hydraulic pressure to the left side of the collars 89 and 90 to disengage the teeth 86 and 87 from the cooperable teeth 85, and to disengage the friction surfaces on 84 and 88. The clutch B is next engaged. This engages the teeth 109 and 111 to the cooperable teeth 107 and positively connects the ring gear 77 with the driven shaft 94. Engagement of both the clutches B and D is permissible at this point as the ring gear 77 and the planet gear carrier are both rotating in unison.

In order to operate the driven shaft 94 at a speed in excess of that of the drive shaft 26, pressure is applied to the right hand side of the clutch D to disengage the same. This pressure acts to move the collars 98, 99, and 100 to the left, thereby disengaging the teeth 104 and 105 from the teeth 103, and disengaging the friction surfaces on 98 and 102. The brake elements 133 are next actuated to stop rotation of the brake drum 76. As a result the sun gear 64 is held from rotation and the planet gears 67 act to rotate the ring gear 77 at a speed faster than the speed of the drive shaft 26.

From the foregoing description it will be obvious that the driven shaft 94 may be held from rotation relative to the drive shaft, may be rotated in a reverse direction with respect thereto, or driven at three rotative speeds in a forward direction. All of this is accomplished by means of clutches and brake units which permit rotation of various parts in unison or stop certain of the elements from rotation. All of the gears of the transmission remain constantly in mesh and the entire transmission may comprise merely a single ring gear, a set of planet gears and a single sun gear.

In accordance with the patent statutes, I have described the principles of construction and operation of my transmission, and while I have endeavored to set forth the best embodiment thereof, I desire to have it understood that obvious changes may be made within the scope of the following claims without departing from the spirit of my invention.

I claim:

1. A transmission including a drive element, a driven element, a sun gear, ring gear, and planet gear carrier supported for rotation relative to said elements, planet gear means carried by said carrier and engaging said sun gear and said ring gear, clutch means between said carrier and said driven element, individually operable brake means for holding said sun gear, ring gear, or carrier from rotation, said planet gear carrier including a pump casing, a fluid pump rotor within said casing, said rotor being connected to said drive element for actuation thereby.

2. The structure described in claim 1 in which the fluid pump is provided with an inlet and an outlet, and by-pass means connecting said inlet and said outlet.

3. The structure described in claim 1 in which the pump is provided with an inlet and an outlet, a by-pass connecting said inlet and said outlet, and means for closing said by-pass to prevent rotation of said rotor relative to said gear carrier.

4. The structure described in claim 1 and including means for holding the rotor from rotation relative to the pump casing when desired.

5. A transmission including a drive element, a driven element, a sun gear, a ring gear, a planet gear carrier supported for rotation relative to said elements, planet gear means carried by said carrier and engaging said sun gear and said ring gear, connecting means for connecting said carrier to said driven element, individually operable brake means for holding said sun gear, ring gear, or carrier from rotation, said planet gear carrier including a pump casing, a fluid pump rotor within said casing, said rotor being connected to said drive element for actuation thereby.

6. The structure described in claim 5 in which the fluid pump is provided with an inlet and an outlet, and by-pass means connecting said inlet and said outlet.

7. The structure described in claim 5 in which the pump is provided with an inlet and an outlet, a by-pass connecting said inlet and said outlet, and means for closing said by-pass to prevent rotation of said rotor relative to said gear carrier.

8. The structure described in claim 5 and including means for holding the rotor from rotation relative to the pump casing when desired.

ALBERT L. JOHNSON.

REFERENCES CITED

The following references are of record in the file of this patent:

UNITED STATES PATENTS

| Number | Name | Date |
|---|---|---|
| 2,248,492 | Cotterman | July 8, 1941 |
| 2,351,061 | Meyer et al. | June 13, 1944 |

FOREIGN PATENTS

| Number | Country | Date |
|---|---|---|
| 5,835 | Great Britain | Mar. 11, 1907 |
| 18,283 | Great Britain | July 17, 1902 |
| 148,273 | Great Britain | Aug. 8, 1921 |